United States Patent [19]

Schad

[11] 4,290,701
[45] Sep. 22, 1981

[54] INJECTION-MOLDING MACHINE WITH RECIPROCATING PLASTICIZING SCREW

[75] Inventor: Robert D. Schad, Bolton, Canada

[73] Assignee: Husky Injection Molding Systems Inc., Bolton, Canada

[21] Appl. No.: 55,371

[22] Filed: Jul. 6, 1979

[51] Int. Cl.³ .............................................. B28C 7/16
[52] U.S. Cl. .................................... 366/77; 366/78; 425/154; 425/207
[58] Field of Search .................................. 366/76–78; 425/154, 208, 207

[56] References Cited

U.S. PATENT DOCUMENTS

| | | | |
|---|---|---|---|
| 3,115,681 | 12/1963 | Hendry | 366/77 |
| 3,117,348 | 1/1964 | Rees | 425/154 |
| 3,204,294 | 9/1965 | Brochetti | 366/78 |
| 3,470,584 | 10/1969 | Iwata et al. | 425/154 |
| 3,908,968 | 9/1975 | Bielfeldt | 366/78 |

*Primary Examiner*—Edward L. Roberts
*Attorney, Agent, or Firm*—Karl F. Ross

[57] ABSTRACT

A plasticizing screw of an injection-molding machine, axially movable in an extruder barrel, is driven by a tubular input shaft via a splined quill partly retractable into the shaft with which the quill is coupled through an internally and externally splined bushing. Another such bushing is removably seated, for possible replacement by a similar bushing of different inner diameter, in an internally splined cup-shaped head of the quill and engages the splined rear end of the screw. The quill head rests via a thrust bearing against the front end of a non-rotatable tubular piston coaxially surrounding the quill and entering by its rear end an annular cylinder which is hydraulically connected with a pressure accumulator including a gas cushion. The accumulator creates a back pressure by which molding material, plasticized by the screw during the preceding phase in which the screw was repressed into a rear position, is introduced via a check valve into a shooting pot alongside the extruder barrel. Another tubular injection piston extends rearwardly into an annular injection cylinder, which is pressurized only briefly upon closure of the mold, and bears at its front end upon a plunger penetrating into the shooting pot whose effective capacity is determined by a manually adjustable backstop for the injection piston. Lubricating oil from a sump in a gearbox surrounding the input shaft is pumped by the reciprocation of the quill, through passages provided for this purpose, to spaces inside the input and inside the extruder piston communicating with each other through the splines of the quill.

13 Claims, 3 Drawing Figures

INJECTION-MOLDING MACHINE WITH RECIPROCATING PLASTICIZING SCREW

FIELD OF THE INVENTION

My present invention relates to an injection-molding machine of the type wherein the molding material is masticated by a screw-type plasticizing extruder before being injected into one or more mold cavities.

BACKGROUND OF THE INVENTION

In such a machine, as described for example in commonly owned U.S. Pat. No. 3,117,348 in the name of Herbert Rees, the originally granular molding material is liquefied and compacted by the plasticizing screw, moving in a heated barrel, and is transferred to a precompression chamber from which it is expelled into a sprue channel either by the screw itself or by an associated injection piston. If the screw also performs the injection function, its rotation must be stopped during the forward stroke; this is inconvenient because it reduces the efficiency of the screw as a plasticizing device and because the repeated starting and stopping subjects the mechanism to considerable wear.

When an injection piston is used, the continuously rotating screw is periodically repressed by the plastic mass accumulating at the forward end of its barrel while its outlet is blocked by a valve before and during an injection stroke. This repression takes place against a restoring force which advances the screw upon the unblocking of the outlet and the retraction of the injection piston from the precompression chamber which is thereupon promptly refilled at the start of a new cycle. The restoring force should not be constant but should progressively increase as the screw moves back so as gradually to build up the compression of the plasticized mass to a predetermined level at the end of the repression movement, i.e. just prior to the unblocking of the outlet; with the screw rotating at constant speed, its backward motion slows down with increasing compaction of the mass whereby its stroke automatically adjusts itself to that of the injection piston. Such a restoring force conforms to the compression characteristic of a coil spring, as described in the aforementioned Rees patents, yet the use of springs is practical only with relatively short strokes.

OBJECTS OF THE INVENTION

An important object of my present invention, accordingly, is to provide improved means for applying a variable restoring force to a plasticizing screw receding under back pressure from the compacted molding material in a machine of the type referred to.

Another object is to provide a simple machanism for hydraulically displacing a plasticizing screw and an associated injection piston in precisely correlated manner.

It is also an object of my invention to provide a coupling between the screw and its driving mechanism which simplifies the replacement of worn parts and facilitates the interchange of screws of different diameters.

A further object, related to the preceding one, is to provide efficient means for lubricating the screw drive and its coupling.

SUMMARY OF THE INVENTION

In accordance with a feature of my present invention, the screw is rotated by drive means comprising a tubular input shaft with internal splines, a quill having a splined rear extremity slidably coupled with that shaft by way of these splines, and a releasable coupling between the screw and a forward extremity of the quill. I further provide operating means for hydraulically advancing the screw to feed the plasticized molding material toward an injection orifice (directly or by way of a precompression chamber) in one phase of a working cycle and to control the retrogression of the screw under the back pressure of the plasticized material in another phase of the cycle, the operating means comprising an annular extruder cylinder coaxially surrounding the quill, a tubular extruder piston partly received in that cylinder and provided with a projecting front end, and bearing means operatively linking this front end with the quill for the transmission of axial forces therebetween.

In an advantageous embodiment, a gear on the input shaft forming part of the drive means is surrounded by a gearbox having conduit means extending from a lower part thereof to one or more elevated locations communicating with the interior of that shaft for facilitating a circulation of lubricating oil from a sump at the bottom of the gearbox through the input shaft and around the splined rear extremity of the quill in response to axial reciprocation of the latter. The conduit means may form passages extending to a rear wall of the gearbox near the shaft axis and to a point forwardly of the shaft adjacent the path of reciprocation of the quill.

According to another feature of my invention, a shooting pot representing the aforementioned precompression chamber is disposed alongside the heated extruder barrel surrounding the plasticizing screw and is provided with a discharge channel terminating at an injection orifice, an outlet port of the barrel located ahead of the screw communicating with the shooting pot via a passage including valve means for enabling the introduction of plasticized molding material from the barrel into the pot during a pre-injection phase of a cycle. A plunger reciprocable in the shooting pot admits the molding material during that pre-injection phase by a rearward movement and moves forward under the control of hydraulic actuating means to expel the admitted material from the pot through an orifice into a mold cavity during a subsequent injection phase. The screw, rotated by its drive means and retreating under pressure of the plasticized molding material in a blocked state of the aforementioned outlet port during most of the mold cycle, is forwardly biased by a hydraulic connection extending from its barrel to a pressure accumulator including a gas cushion, this accumulator storing pressure during the retreat of the screw and releasing the stored pressure to re-advance the screw upon an unblocking of the outlet port in a pre-injection phase forming part of the next cycle.

If the injection orifice is automatically blocked in the mold-open state, the valve means in the outlet port of the barrel may be a simple check valve as described in the Rees patent. Otherwise, it should have a valve body oscillatable in timed relationship with the hydraulic plunger-actuating means between a blocking position and an unblocking position, as likewise known per se.

BRIEF DESCRIPTION OF THE DRAWING

The above and other features of my invention will now be described in detail with reference to the accompanying drawing in which.

SPECIFIC DESCRIPTION

Figure 1:
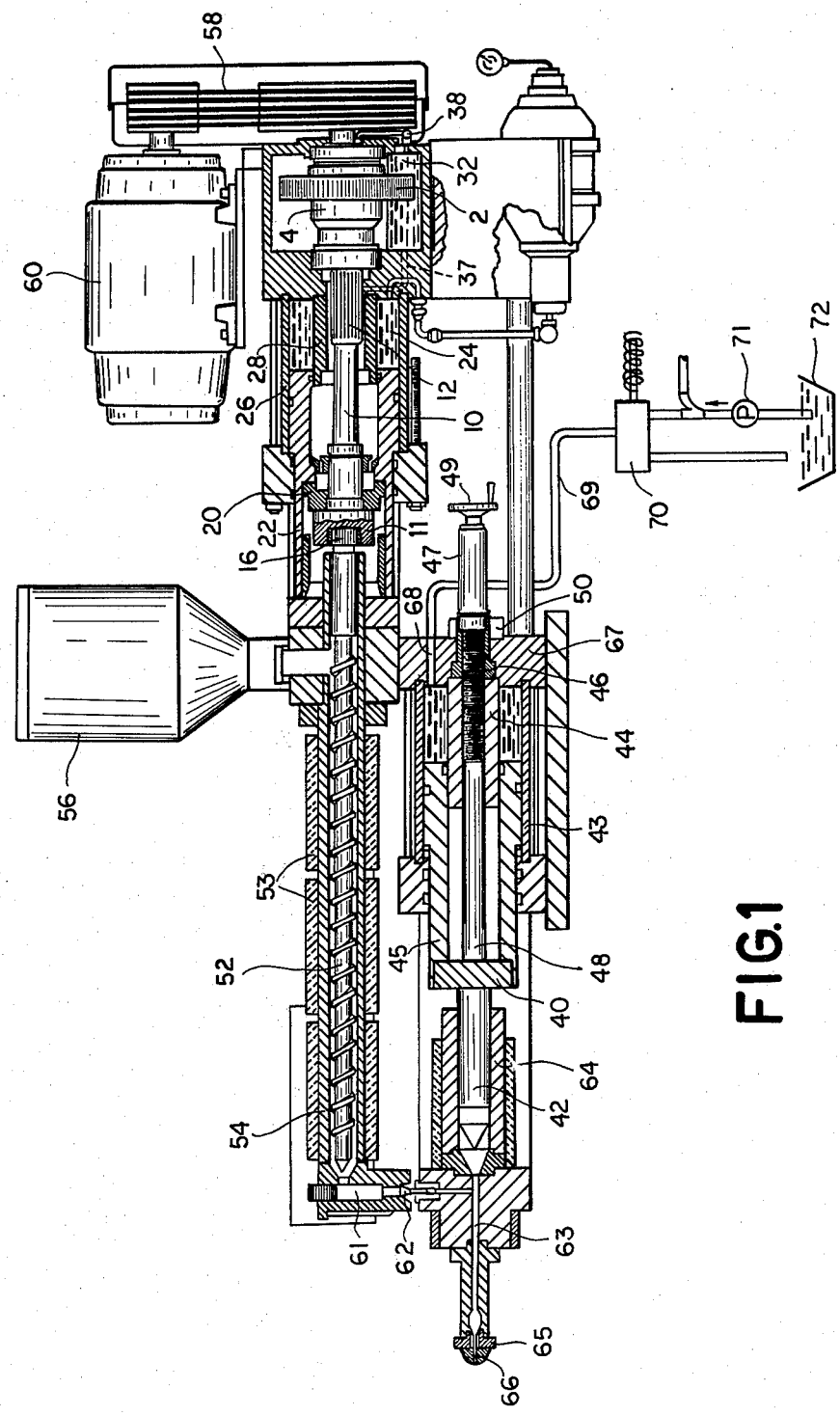
FIG. 1 is a side-elevational view, partly in section, of the plasticizing and injection portion of an otherwise conventional molding machine.

As illustrated in FIG. 1, an injection-molding machine of the general type described in Rees U.S. Pat. No. 3,117,348 comprises—besides its nonillustrated conventional parts including a substantially fixed platen and a movable platen—a stationary barrel 54, surrounded by several heater bands 53, in which a screw 52 is rotatable and axially reciprocable. Rotation is imparted to the screw by a motor 60 and a belt drive 58 through the intermediary of a quill 10 in a manner more fully described hereinafter with reference to FIG. 2. Granular plastic material introduced into barrel 54 from a hopper 56 is advanced by the rotating screw 52 toward a passage 61 at the front end of the barrel, this passage communicating via a check valve 62 with a discharge channel 63 which opens rearwardly into a shooting pot 64 and extends forwardly into a nozzle 65 whose injection orifice 66 is blocked when the mold is open, in the manner described in the Rees patent.

A plunger 42 extending into the shooting pot 64 abuts with its rear end a face plate 40 of a cylindrical injection piston 45 which is axially slidable in a hydraulic cylinder 43 and is internally guided by a sleeve 44. The sleeve is traversed by a rod 48, held against rotation by a nonillustrated key, which has a threaded portion engaged by a captive nut 46 that is rotatably seated in an end wall 67 of cylinder 43 rigid with the machine frame. Nut 46 forms an extension of a tubular shaft 47 which is rotatably journaled in wall 67 and carries a handwheel 49 whose rotation advances or retracts the rod 48 acting as an adjustable stop for the face platen 40 and thus for the plunger 42. By this stop, whose position can be fixed by means of a friction clamp 50 surrounding the shaft 47, the maximum volume of shooting pot 64 is determined.

A port 68 in wall 67 is connected by a conduit 69 to a solenoid valve 70 which, in the usual manner, is periodically reversed in step with the mold cycle to connect the interior of injection cylinder 43 to the discharge end of a hydraulic pump 71 or to drain that cylinder to a reservoir 72. With the mold closed and nozzle orifice 66 open, valve 70 is briefly operated to let the pump pressure advance the piston 45 and the plunger 42 to the left so as to inject plastic material from shooting pot 64 into the cavity or cavities of the mold; the presence of check valve 62 prevents any part of that material from returning to barrel 54. Upon the subsequent reversal of valve 70, freshly made-up molding material may again enter the shooting pot via passage 61 and channel 63 under pressure of screw 52, thereby forcing back the plunger 42 and the piston 45 to the extent permitted by the stop rod 48.

Figure 2:
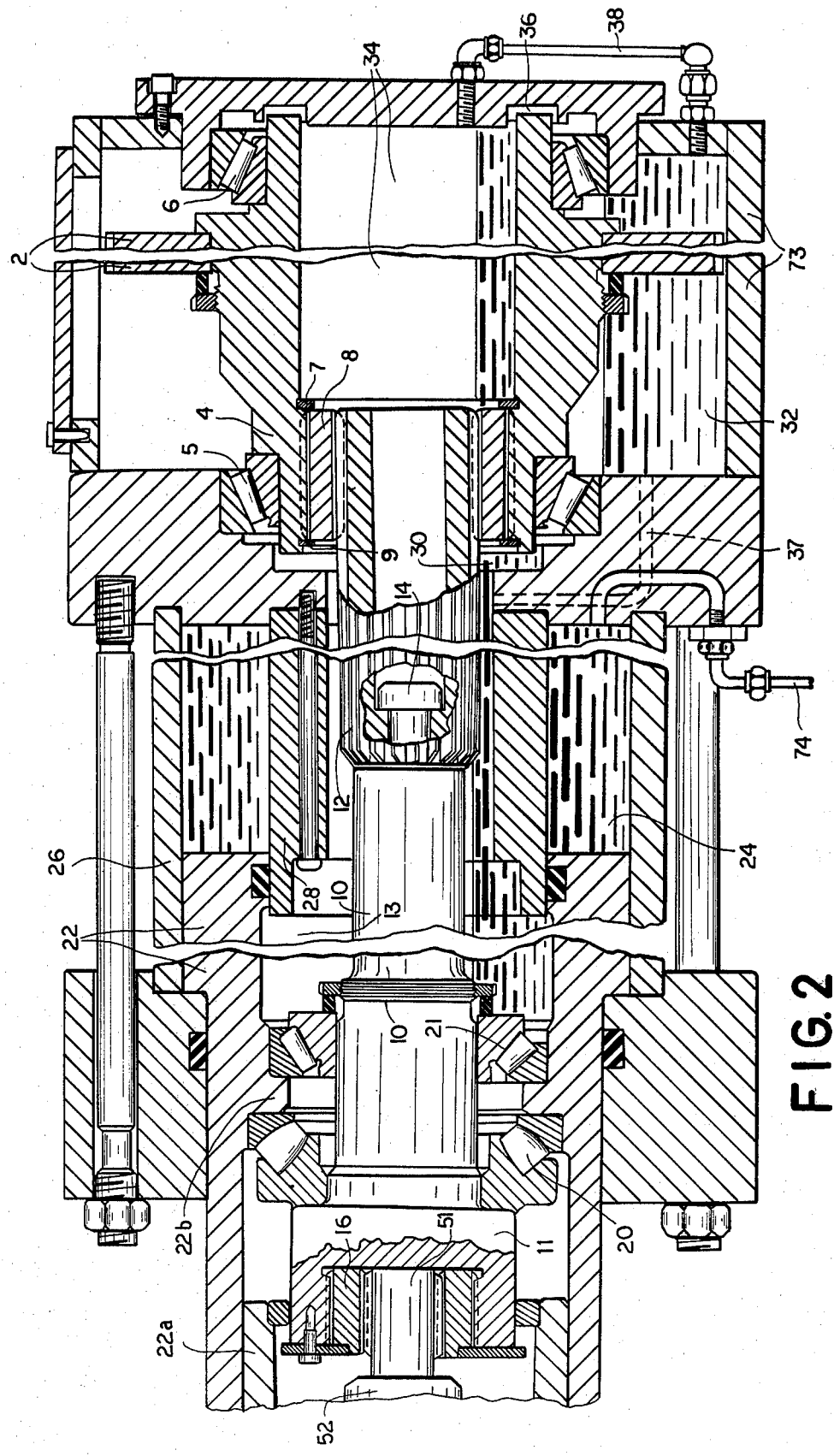
FIG. 2 is an enlarged sectional view of part of the assembly shown in FIG. 1.

Transmission 58 drives a nonillustrated pinion in mesh with a spur gear 2 which is seated on a tubular input shaft 4 entraining the quill 10 by way of a splined bushing 8, as seen in FIG. 2; a similar bushing 16 couples the front end of the quill to a splined rear end of screw 52. Shaft 4 is journaled in a surrounding housing 73 by roller bearings 5 and 6; two snap rings 7 and 9 hold the bushing 8 in a fixed axial position of engagement with internal splines of that shaft. The splined rear extremity 12 of quill 10 is slidably entrained by complementary inner splines of bushing 8; with screw 52 occupying its extreme left-hand position within barrel 54 in FIGS. 1 and 2, the quill extremity 12 may move to the right from its illustrated position within the interior 34 of shaft 4. A long bolt 14 has a head bearing upon an internal shoulder of this extremity and axially traverses the quill body to engage the rear end 51 of screw 52.

Quill 10 is surrounded by a stationary hydraulic cylinder 24 having coaxial outer and inner walls 26, 28 rigid with housing 73. This cylinder accommodates the rear end of a tubular hydraulic extruder piston 22 which has a front end reinforced by an inner sleeve 22a and is provided rearwardly thereof with an internal annular shoulder 22b engaging the forward extremity of the quill 10 through roller bearings 20 and 21. This forward extremity forms a head 11 with inner splines engaging complementary outer splines of the bushing 16 which couples the quill to the rear end 51 of screw 52. Bearing 20 transmits axial thrusts from piston 22 to screw 52 and vice versa.

Figure 3:
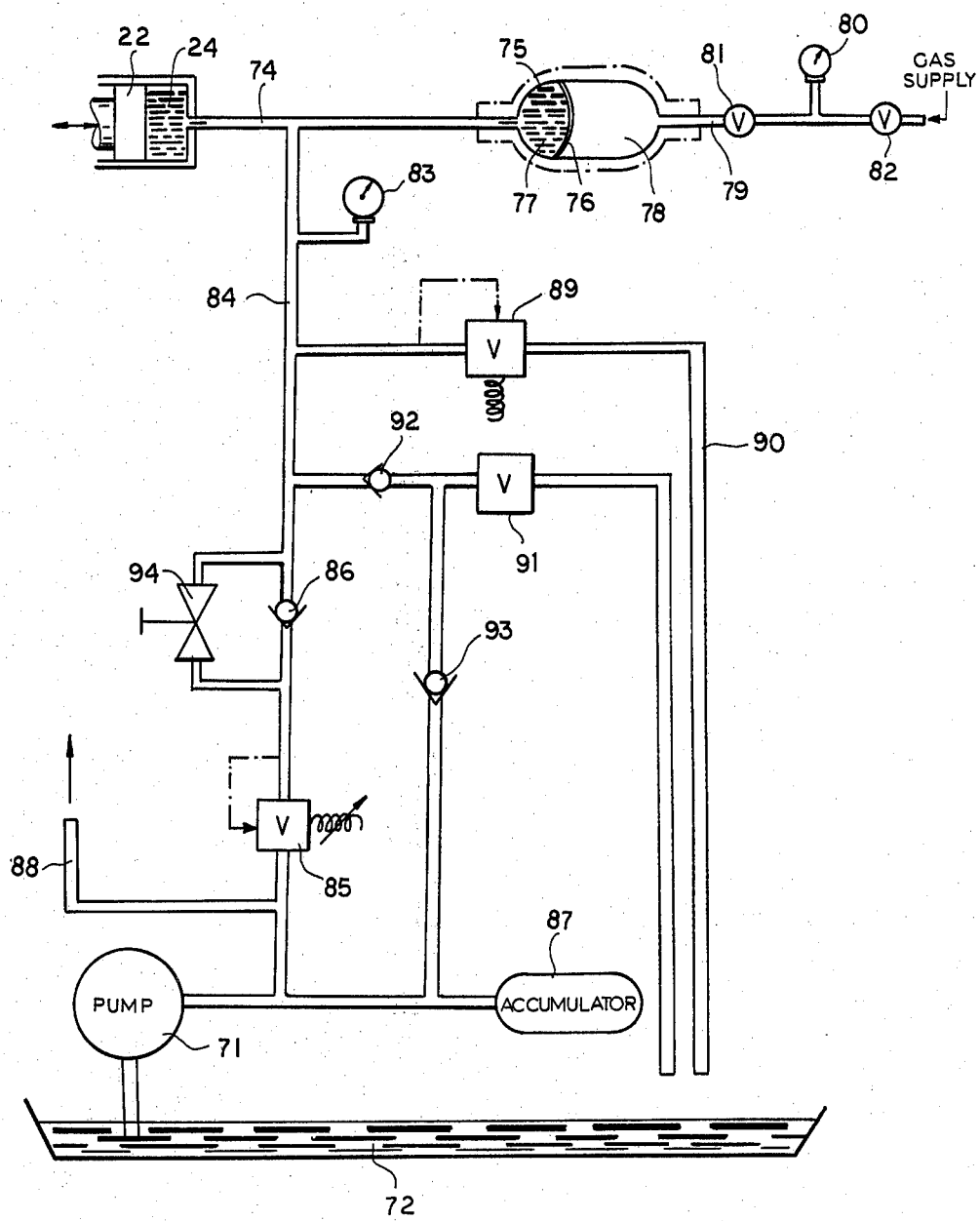
FIG. 3 diagrammatically illustrates part of a hydraulic system which operates the machine of FIG. 1.

Cylinder 24 communicates with a pipe 74 also indicated schematically in FIG. 3. This pipe extends to a hydraulic pressure accumulator 75 comprising a diaphragm 76 which separates an oil compartment 77 from a gas compartment 78; a high-pressure gas such as nitrogen is admitted to compartment 78 from a nonillustrated compressor via a pipe 79 provided with a pressure gauge 80 and shut-off valves 81, 82. Another pressure gauge 83 is connected to a branch 84 of line 74 to which oil is supplied by the pump 71 via a pressure-regulating valve 85 of adjustable threshold in series with a check valve 86. Pump 71 feeds a main accumulator 87 designed to equalize the pressures acting upon other parts of the system (including the piston 45 of FIG. 1) to which the pump 71 is connected by way of a line 88.

A calibrated valve 89 in a conduit 90 extending from branch 84 to reservoir 72 determines the upper limit of the oil pressure in line 74 whose lower limit is given by the threshold of valve 85. A dump valve 91 allows the draining of the conduits when the machine is shut down, with check valves 92 and 93 preventing the oil from bypassing the regulating valve 85 during normal operation. The operating pressure in line 74 and accumulator 75 can be modified by adjusting the threshold of valve 85; if the pressure is to be lowered, a shut-off valve 94 in parallel with check valve 86 must be temporarily opened.

With this arrangement, pump 71 compensates any oil leakage occurring in line 74 or accumulator 75 whereby a progressively increasing restoring force acts upon the screw 52 when the latter is repressed (to the right in FIGS. 1 and 2) by the compacted molding material after the shooting pot 64 has been filled to capacity so that the outlet 61 of barrel 54 is effectively blocked. This blocking continues even when the nozzle orifice 66 has been opened, owing to the injection pressure exerted by the plunger 42 upon the check valve 62 via the plastic mass present in the shooting pot 64 and channel 63. The subsequent reversal of valve 70, depressurizing the piston 45, unblocks this outlet and allows the force stored in accumulator 75 (FIG. 3) to drive the piston 22 together with quill 10 and screw 52 to the left, thereby discharging the freshly compacted mass into the shooting pot from which the plunger 42 is now free to retreat as the cylinder 43 is being drained to reservoir 72. The reciprocation of the plasticizing screw is therefore precisely correlated with the operation of the injection piston 45 and its extension constituted by plunger 42.

The interior 34 of input shaft 4 communicates via a pipe 38 with an oil sump 32 in housing 73 from which lubricating oil is aspirated into the space 34 as the quill 10 advances into the position shown in FIG. 2. Lubricating oil is also drawn from sump 32 through a passage 37 into a space 13 surrounding the quill. Upon rightward repression of assembly 10, 22, 52, part of the aspirated oil is returned to the sump through bearing 5 by way of a clearance 30 between housing 73 and shaft 4 as well as through bearing 6 via a passage 36 at the rear of the housing. Some of the oil also passes between the splines of quill extremity 12 and bushing 8. Thus, the axially reciprocating assembly exerts a pumping action eliminating the need for any additional lubricant-circulating means. The lubricating-oil circuit, however, is well separated from the pressure-oil circuit including extruder cylinder 24 and line 74.

While the quill head 11 cannot be significantly enlarged, on account of space limitations, the bushing 16 can be replaced by another one of increased or reduced wall thickness in order to accommodate a plasticizing screw of smaller or larger diameter than the illustrated screw 52. Bushing 8 as well as quill extremity 12 may also be readily exchanged in the case of wear or when the transmission of a larger or a smaller torque is called for.

It will be understood that the connection between bushing 8 and shaft 4 need not necessarily be in the form of splines; the same applies to quill head 11 and bushing 16.

Check valve 62 could be replaced by a rotary valve at the junction of passage 61 with channel 63, designed to connect the shooting pot 64 alternately to passage 61 and to orifice 66.

I claim:

1. In an injection-molding machine including a heated extruder barrel, a plasticizing screw rotatable and axially reciprocable in said barrel, drive means for rotating said screw, operating means for hydraulically advancing said screw for feeding plasticized molding material toward an injection orifice in one phase of a working cycle and for controlling the rearward motion of said screw under pressure of freshly plasticized molding material in another phase of the cycle, and feed means for supplying said molding material to said barrel, the improvement wherein said drive means comprises a tubular input shaft with internal splines, a quill having a splined rear extremity slidably coupled with said input shaft by way of said internal splines, and a releasable coupling between said screw and a forward extremity of said quill;

said operating means comprising an annular extruder cylinder coaxially surrounding said quill, a tubular extruder piston partly received in said extruder cylinder and provided with a projecting front end, bearing means operatively linking said front end with said quill for transmitting axial forces therebetween, a shooting pot alongside said barrel provided with a discharge channel terminating at said injection orifice and communicating with an outlet port of said barrel ahead of said screw, a plunger in said shooting pot controlled by hydraulic actuating means, and adjustable backstop means limiting the stroke of said plunger.

2. The improvement defined in claim 1 wherein said forward extremity is provided with an enlarged head accommodating said releasable coupling, said bearing means comprising a thrust bearing inserted between said head and a forwardly facing transverse shoulder of said front end.

3. The improvement defined in claim 2 wherein said releasable coupling comprises an internally splined bushing seated in said head, said screw having a splined rear portion received in said bushing.

4. The improvement defined in claim 1, 2 or 3 wherein said internal splines are part of a bushing seated in said input shaft.

5. The improvement defined in claim 1, 2 or 3 wherein said drive means additionally comprises a gear on said input shaft surrounded by a gearbox, further comprising conduit means extending from a lower part of said gearbox to at least one elevated location communicating with the interior of said input shaft for facilitating a circulation of lubricating oil from a sump at the bottom of said gearbox through said input shaft and around said splined rear end in response to axial reciprocations of said quill.

6. The improvement defined in claim 5 wherein said conduit means forms passages extending to a rear wall of said gearbox near the axis of said input shaft and to a point forwardly of said input shaft adjacent the path of reciprocation of said quill.

7. The improvement defined in claim 1, 2 or 3 wherein said actuating means comprises a tubular injection piston coaxial with said plunger, an annular injection cylinder receiving part of said injection piston, and intermittently effective pressurizing means for admitting hydraulic liquid to said injection cylinder at a predetermined instant of said working cycle; said backstop means including a threaded rod extending axially within said injection piston for coaction with a transverse member thereof.

8. The improvement defined in claim 7 wherein said backstop means further comprises a captive nut engaging said spindle, said nut being rotatably held in an end wall of said injection cylinder, and a handwheel connected with said nut, said rod being nonrotatably guided in an inner peripheral wall of said injection cylinder.

9. The improvement defined in claim 8 wherein said discharge channel is connected to said outlet port by way of valve means preventing a return flow from said shooting pot to said barrel, said operating means further comprising a pressure accumulator connected to said extruder cylinder for receiving hydraulic fluid therefrom during rearward motion of said screw and redischarging said hydraulic fluid into said extruder cylinder upon a pressure reduction in said discharge channel resulting from a depressurization of said injection piston.

10. In an injection-molding machine, in combination:
a heated extruder barrel;
feed means for supplying molding material to said barrel;
a plasticizing screw rotatable and axially reciprocable in said barrel;
a shooting pot alongside said barrel provided with a discharge channel terminating at an injection orifice, said barrel being provided ahead of said screw with an outlet port communicating with said shooting pot via a passage including valve means for enabling the introduction of plasticized molding material from said barrel into said shooting pot during a pre-injection phase;

a plunger reciprocable in said shooting pot for admitting said molding material into same during said pre-injection phase by a rearward movement and for expelling the admitted molding material through said orifice into a mold cavity during a subsequent injection phase by a forward movement;

hydraulic actuating means coupled with said plunger for intermittently moving same forward;

a pressure accumulator including a gas cushion;

drive means for rotating said screw while allowing same to retreat under pressure of the plasticized molding material in a blocked state of said outlet port during said pre-injection phase; and a hydraulic connection between said barrel and said accumulator for storing pressure therein during the retreat of said screw and releasing the stored pressure to re-advance said screw upon an unblocking of said outlet port in a subsequent pre-injection phase for discharging the plasticized material into said shooting pot.

11. The combination defined in claim 10 wherein said hydraulic connection comprises a piston mechanically coupled with said screw, a hydraulic cylinder receiving said piston, and conduit means linking said cylinder with said accumulator.

12. The combination defined in claim 11, further comprising pump means connected to a source of hydraulic liquid, a unidirectional hydraulic path extending from said source to said conduit means, and pressure-sensitive control means in said path for admitting hydraulic liquid from said source to said conduit means upon the pressure of said accumulator falling below a predetermined threshold, thereby compensating for leakage losses in said hydraulic connection.

13. The combination defined in claim 10, 11 or 12, further comprising adjustable backstop means limiting the stroke of said plunger.

* * * * *